United States Patent [19]
Carson et al.

[11] 3,807,218
[45] Apr. 30, 1974

[54] SAMPLING DEVICE FOR DYNAMOELECTRIC MACHINE

[75] Inventors: Chester C. Carson, Ballston Spa; Sterling C. Barton; Federico S. Echeverria, both of Scotia, all of N.Y.

[73] Assignee: General Electric Company, Schenectady, N.Y.

[22] Filed: Feb. 26, 1973

[21] Appl. No.: 336,024

[52] U.S. Cl. ............... 73/28, 73/421.5 R, 73/432 R
[51] Int. Cl. ........................................... G01n 15/00
[58] Field of Search .......................... 73/421.5 R, 28

[56] References Cited
UNITED STATES PATENTS
2,978,582   4/1961   Shoepe .................................. 73/28

*Primary Examiner*—S. Clement Swisher
*Attorney, Agent, or Firm*—John F. Ahern; James W. Mitchell

[57] ABSTRACT

In a gas-cooled dynamoelectric machine, some machine parts contain, or are coated with, organic materials; which, upon the occurrence of localized overheating, undergo thermal decomposition and emit submicron particles into the gas coolant. An ion chamber detector has been devised for sensing the presence of these products of thermal decomposition in the gas coolant. Moreover, different organic materials produce different products of thermal decomposition which have different identifiable characteristics. If different parts of a dynamoelectric machine contain, or are coated with, different organic materials, the products of thermal decomposition may be analyzed to determine the particular localized overheating area. A sampling device for collecting these products of thermal decomposition is described herein, along with its application to a dynamoelectric machine having an ion chamber detector included therewith.

7 Claims, 4 Drawing Figures

SAMPLING DEVICE FOR DYNAMOELECTRIC MACHINE

BACKGROUND OF THE INVENTION

This invention relates, in general, to gas-cooled dynamoelectric machines; and, in particular, relates to a sampling device for collecting identifiable pyrolysis products given off during localized overheating which may be analyzed to determine the location of said localized overheating.

Localized overheating in stator cores of large dynamoelectric machines is a rare occurrence; however, a core damaged by overheating can lead to extensive machine outage and costly repairs. One of the ways that overheating can occur is by damage to the surface of a stator "tooth" such that electric contact can take place between laminations leading to flow of electric current and resistance heating when a machine is carrying load. Local overheating of this nature can generate enough heat to melt the silicon steel constituting the core laminations. It is therefore desirable to provide a system for detecting localized overheating in a dynamoelectric machine at an early stage, and, for idenfitying the location of the overheating.

In U. S. Pat. No. 3,427,880, to Grobel et al., issued Feb. 18, 1969 and assigned to the assignee of the present invention, there is described an overheating detector system for a dynamoelectric machine. An ion chamber detector, of the kind described in U. S. Pat. No. 3,573,460, issued Apr. 6, 1971, to George F. Skala, and assigned to the assignee of the present invention is used to detect submicron particles given off by various organic materials, into the coolant gas of the dynamoelectric machine, when certain machine parts, coated with the organic materials, become overheated. These submicron particles given off by thermally decomposing organic materials as the result of localized overheating are known as pyrolysis products. Pyrolysis products of each type of organic material possess identifiable characteristics discernible under mass spectrometric or gas chromatographic analysis techniques. The Grobel et al. patent is concerned with detecting the presence of pyrolysis products in the gas coolant whereas it is further desirable to locate the source of the pyrolysis products introduced into the dynamoelectric machine gas coolant.

In U. S. Pat. No. 3,428,838 to Carson et al., assigned to the assignee of the present invention, and issued Feb. 18, 1969, a "Wear Detector for Fluid-Cooled Electric Machine" is proposed. In that patent, relatively large particles of insulation, mechanically produced (as by vibration), within a dynamoelectric machine are entrained in the fluid coolant and trapped outside the machine on a membrane filter. The filter is periodically examined for wear particles. The present invention is directed toward the detection of localized overheating and the collection of submicron particles as a result of thermal decomposition.

SUMMARY OF THE INVENTION

In a gas-cooled dynamoelectric machine, different parts of the dynamoelectric machine may contain, or are coated with different organic materials, such as insulations and polymeric resins. If localized overheating occurs within the dynamoelectric machine, then some of these organic materials will decompose to give off pyrolysis products or submicron products which enter into the gas coolant. The gas coolant is continuously monitored by an ion chamber detector which activates an alarm if these submicron pyrolysis products are detected in the gas coolant. Thereafter, a portion of the gas coolant may be diverted through a sampling device containing an absorbent material which absorbs the pyrolysis products out of the gas coolant. The sampling device is subsequently removed so that a mass spectrometric or gas chromatographic analysis may be performed on the sample obtained. In this manner the source of the pyrolysis products is identified and, hence, the location of the hot spot is generally determined.

It is therefore one object of the present invention, in a dynamoelectric machine, to provide a means for detecting the presence of submicron pyrolysis products in the coolant gas, of the machine, in conjunction with a means for generally identifying the source of said pyrolysis products.

It is another object of the present invention to provide a sampling device for collecting submicron particles out of the gas coolant.

It is another object of the present invention to provide a sampling device which is removable from the dynamoelectric machine, for analysis, without shutting down the machine and which will indicate upon analysis, the general location of the hot spot without opening up the machine.

Other objects, advantages and features of the present invention will become apparent from the following detailed description of several embodiments thereof taken in connection with the accompanying drawings.

DETAILED DESCRIPTION OF THE INVENTION

Figure 1:
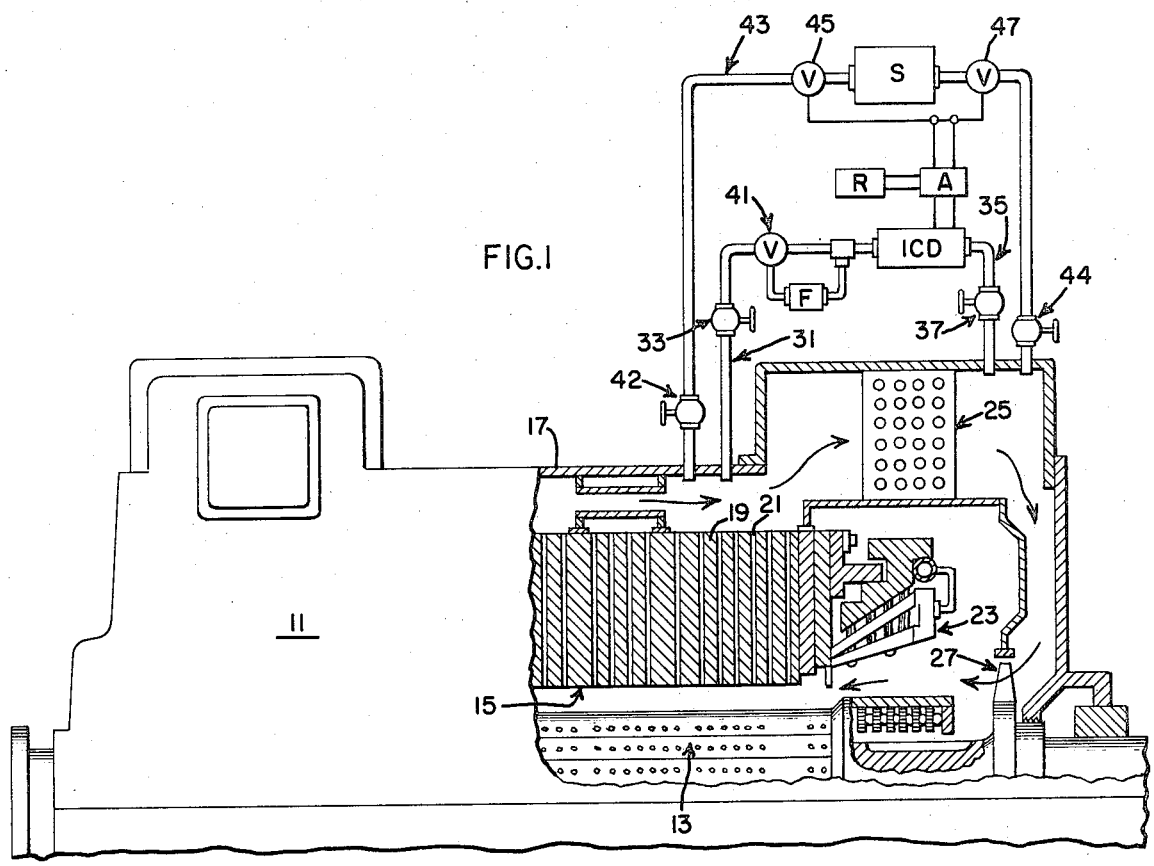
FIG. 1 is an elevation side view, partially cut away, of a dynamoelectric machine including apparatus affixed thereto for sampling gas coolant according to the present invention.

Referring to FIG. 1, a dynamoelectric machine 11, for example, a turbine-generator, includes a rotor 13 and stator core 15 supported within a gas-tight casing 17. The stator core is comprised of laminations 19 separated by cooling ducts 21. The laminations are formed with slots for carrying stator windings (not shown), and at either end of the stator core these stator windings are reversed to reenter the stator core, the reversing portions known as end windings 23. A gas coolant, such as hydrogen, is circulated around the dynamoelectric machine and through the cooling ducts 21 in the stator core and through heat exchangers 25 (only one shown) by a rotor mounted fan 27 (only one shown). Additionally, it is usual to further cool the stator core windings by sending a liquid coolant through the stator windings. It will be appreciated, that it has long been a practice to coat the stator core laminations, end windings, etc., with various organic materials such as epoxy and polymeric resins and insulations. These organic materials, when heated, will emit submicron particles as pyrolysis products which are both detectable and identifiable as will be further discussed.

A portion of the gaseous coolant fluid is withdrawn from the high-pressure side of the machine casing by an extraction pipe 31 having a shutdown valve 33 incorporated therein; and, the gas fluid is directed back into the low-pressure side of the machine casing by a return pipe 35 with shutdown valve 37. Thus, gas flow out of and into the machine is caused by pressure differences within the machine casing. An ion chamber detector (ICD) is interconnected in series flow between the extraction pipe and return pipe for sensing the presence of submicron pyrolysis particles carried by the fluid coolant. A filter F may be used to selectively determine the validity of a detector alarm by operation of three-way valve 41. The detector is electrically connected to an amplifier, A, and recorder R. The immediate aforementioned discussion is all exemplified, in greater detail, in the Grobel et al. patent, U. S. Pat. No. 3,427,880.

In an illustrative embodiment of the present invention, a sampler loop 43 is connected in a manner similar to the connections for the ion chamber detector with respect to the dynamoelectric machine including machine extraction and return valves 42 and 44 respectively. These valves are normally open during all operations except when a sampling device S is removed from the loop for analysis. The valves may be manually operated. The sampling device S is schematically illustrated in the sampler loop and will be hereafter described in greater detail. Immediately upstream and downstream of the sampling device S are sampler isolation valves 45 and 47 respectively. Valves 45 and 47 are used to isolate the sampling device from contamination until an ion chamber detector alarm is given. These valves may be manually operated; but preferably, as shown, are activated by the ion chamber detector through the amplifier which automatically causes the valves, normally closed, to open upon an alarm signal. Thus, valves 45 and 47 may be solenoid valves.

Figure 2:
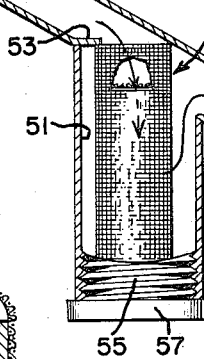
FIG. 2 is an elevation section of a pipe showing one embodiment of the sampling device according to the present invention and one manner in which it may be applied to a dynamoelectric machine and detector apparatus.
Figure 3:
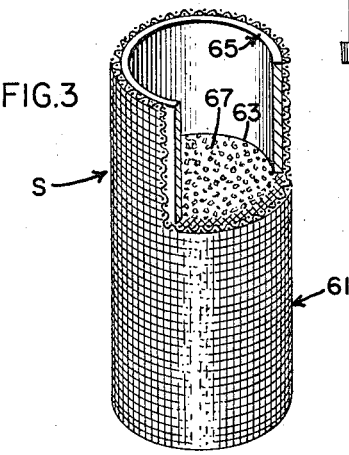
FIG. 3 is an elevation view, partially cut away, showing the one embodiment of a sampling device of the present invention removed from the pipe section.

FIGS. 2 and 3 show one embodiment of the sampling device according to the present invention. In particular, FIG. 2 shows a portion of loop 43 taken just after the upstream valve 45 and just prior to the downstream valve 47. A sampling device, illustrated schematically in FIG. 1 and now shown in detail in FIG. 2, is positioned within a pipe section 51 which terminates in a lip 53 at its closed end and includes internal threads 55 at its open end. A removable threaded plug 57 is inserted at the open end of the pipe section for retaining the sampling device.

FIG. 3 shows the one embodiment of the sampling device including a porous wire mesh cylinder 61 including a wire mesh platform 63 formed therein. A sleeve 65 is mounted in the cylinder and supported on the platform within which an absorbent material 67 is disposed. The absorbent material may be, for example, silica gel. The main requirement of the sampling device is that it be capable of separating pyrolysis products from the coolant gas.

Figure 4:
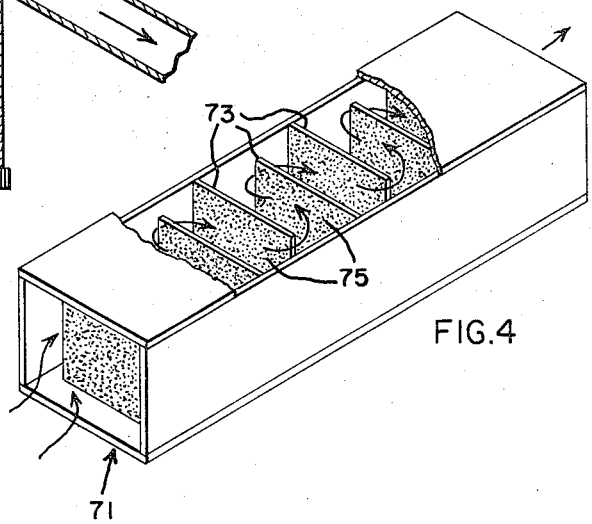
FIG. 4 shows a perspective view of a second embodiment of a sampling device, according to the present invention, partially cut away.

FIG. 4 shows an alternative embodiment of a sampling device including an open-ended container 71 having a number of baffles 73 positioned therein. Each face 75 of each baffle is coated with an absorbent medium such as silica gel, which may be in powdered form. The advantage of this device is the amount of exposed silica gel surface area relative to the overall volume of silica gel used which results in a higher concentration sampling. The baffles may be porous or non-porous as long as a flow path is provided through the filter.

If a machine is opened up after a validated alarm signal, then the overheated area should be visible as a charred area; however, it would be very desirable to know which material is thermally decomposing to produce an overheating signal without opening up the dynamoelectric machine. Such knowledge, indicating the location of the localized overheating, might obviate opening up of the machine or at least indicate beforehand what corrective action is necessary thereby decreasing shutdown time.

Techniques are generally available for identifying pyrolysis products including mass spectrometric analysis and gas chromatographic analysis. Pyrolysis products in the form of submicron particles are absorbed on the silica gel contained in the sampling device. The sampling device may then be removed from the machine and the silica gel heated giving off the pyrolysis products in the form of gases and vapors which are then analyzed by one or both of the methods indicated. The purpose of the analysis is not strictly qualitative as interest is not directed so much as to what is overheating but rather where overheating is occurring. Since each organic material heated will give off "fingerprints" in the form of mass spectrometric or gas chromatographic peaks, it is only necessary to match up test information against a standard blueprint of the machine. However, as a corollary, the identified peaks will generally yield the name of the overheating material.

In Table I, below, results of analysis of various organic materials, collected on silica gel, and run through mass spectrometric and gas chromatographic techniques are summarized:

TABLE I.—OVERHEATING RESPONSE TEMPERATURES AND MASS SPECTROMETRIC AND GAS CHROMATOGRAPHIC ANALYSES OF PYROLYSIS PRODUCTS

| Sample number | Description | Temp. producing Alarm °C | Mass peaks sample heated from 50°C to 350°C | Time, min. | Gas chromatographic peaks — Sample heated to 500°C, peak height | 1000°C, peak height |
| --- | --- | --- | --- | --- | --- | --- |
| 1 | Phenolic varnish | 260 | 43, 57, 58, 97, 168 | 2.4 | 35 | 180 |
| 2 | Epoxy-glass pressed composite | 240 | 94, 107, 121, 122, 135, 136 | 2.4 | 30 | 640 |
|   |   |   |   | 2.9 | 22 | 304 |
|   |   |   |   | 3.2 |   | 80 |
|   |   |   |   | 3.7 |   | 76 |
|   |   |   |   | 6.6 |   | 20 |
| 3 | Epoxy-glass sheet composite | 215 | 77, 78, 91, 103, 104, 117, 118 | 2.4 | 50 | 500 |
|   |   |   |   | 2.5 |   | 880 |
|   |   |   |   | 2.9 | 33 |   |
|   |   |   |   | 3.7 |   | 82 |
|   |   |   |   | 5.5 |   | 80 |
|   |   |   |   | 5.7 | 30 |   |
| 4 | Mica-glass laminate | 190 | 43, 57, 58, 97, 168 | 2.4 |   | 25 |
|   |   |   |   | 2.6 |   | 400 |
|   |   |   |   | 2.9 |   | 120 |
|   |   |   |   | 3.6 |   | 47 |
| 5 | Silicone rubber | 180 | 50, 76, 104, 105, 147 | 2.4 | 30 | 83 |
|   |   |   |   | 2.7 | 18 | 100 |
| 6 | Polymethylmethacrylate | 160 | 39, 41, 68, 85, 100 | 2.4 | 10 | 10 |

Some mass spectrometric results are similar for different materials, e.g., samples 1 and 4. For this reason gas chromatographic analysis may be preferable. It can be seen, from the above, that most of the gas chromatographic peaks are pronounced and therefore leads to the conclusion that such analysis on the decomposition products of a material or coating that thermally decomposes can indicate the area where the localized overheating is occuring.

The operation of the invention is as follows. Various dynamoelectric machine parts may selectively contain, or be coated with, organic materials which will thermally decompose when localized overheating occurs. Thermal decomposition of the organic material causes submicron particles or pyrolysis products to be emitted into the gas coolant. The gas coolant is tapped from a high-pressure region of the dynamoelectric machine. In the preferred embodiment, two high-pressure taps are made, i.e., one for the ion chamber detector and one for the sampling loop. However, it is obvious that other arrangements may be made including the use of only one high-pressure tap wherein the sampling device is selectively utilized in the ion chamber detector line. Moreover, more than one sampling device may be included as a spare part or alternative sampling line. Pyrolysis products in the form of submicron particles will cause an alarm in the ion detector chamber. Thereafter, the isolation valves immediately upstream and downstream of the sampling device are opened and a sample taken. The sampler may be manually activated or operated by electrical signal, as is shown. Verification of the alarm signal may be made by opening three-way valve 41 and filtering the total gas flow and verifying a normal signal on the ion chamber detector. Sampling may occur in response to an alarm signal or it may occur periodically for machine testing.

In the sampler loop 43 valves 42 and 44 remain open until the sampler S is removed for analysis. At that time, and until a new sampler is inserted the valves remain closed. The isolating valves 45 and 47 are normally closed except when sampling occurs. The redundant valve system (42, 44) is a safety feature related to preventing the escape of gas coolant from the machine should either solenoid valve fail when the sampler device is removed from the machine. Valves 45 and 47 protect the silica gel charge from contamination.

The sampling device may be in the form shown in FIGS. 2 and 3; or in the form shown in FIG. 4. After a sufficient sampling is taken, in the sampler loop, the sampling device is removed for analysis. Mass spectrometric or gas chromatographic analysis will result in a showing of peaks which will be compared to the standard peaks of the dynamoelectric machine blueprint thereby indicating the area of the localize overheating.

While there is shown what are considered, at present, to be the preferred embodiments of the invention, it is, of course, understood that various other modifications may be made therein, and it is intended to claim all such modifications as fall within the true spirit and scope of the present invention.

What is claimed is:

1. In combination with an ion chamber detector for sensing the presence of submicron thermal decomposition products given off into a gas coolant in a dynamoelectric machine due to localized overheating in dynamoelectric machine parts; an apparatus for collecting said thermal decomposition particles for analysis in response to a signal from said ion chamber detector comprising:

a conduit carrying at least a portion of said gas coolant;

a sampling device, within said conduit, for separating thermal decomposition particles from said gas coolant;

a first valve, normally closed, on said upstream side of said sampling device; and, a second valve, normally closed, on said downstream side of said sampling device whereby said first and second valves may be opened, for sampling, in response to a signal from said ion chamber detector.

2. The apparatus recited in claim 1 wherein said sampling device includes a container having a porous flow path and further including an absorbent material within said container flow path.

3. The apparatus recited in claim 2 wherein said absorbent material is silica gel.

4. The apparatus as recited in claim 1 wherein said apparatus further includes:

a pipe section extending, at an angle, from said conduit having a threaded free end and a lip portion formed on its opposite end, said sampling device removably inserted into said pipe section and conduit abutting said lip portion; and, a threaded plug removably inserted into said threaded end of said pipe section.

5. The apparatus as recited in claim 4 wherein said sampling device includes;

a porous cylinder having a porous platform formed between the ends of the cylinder; and a non-porous sleeve supported on said porous platform, having an absorbent material contained therein; whereby gas coolant is forced to flow through said non-porous sleeve and absorbent material while flowing through said porous cylinder.

6. The apparatus as recited in claim 1 wherein the sampling device includes:

a non-porous, open-ended, container having a flow path therethrough;

a plurality of baffles mounted within said container, each baffle having an absorbent surface coating.

7. The apparatus recited in claim 1 wherein each valve is automatically opened in response to an electrical signal from said ion chamber detector.

* * * * *